Nov. 11, 1947.  F. H. SCHNEIDER  2,430,848
BROILER
Filed Oct. 27, 1944  3 Sheets-Sheet 1

Inventor:
Frank H. Schneider,
by Yardley Chittick
Attorney

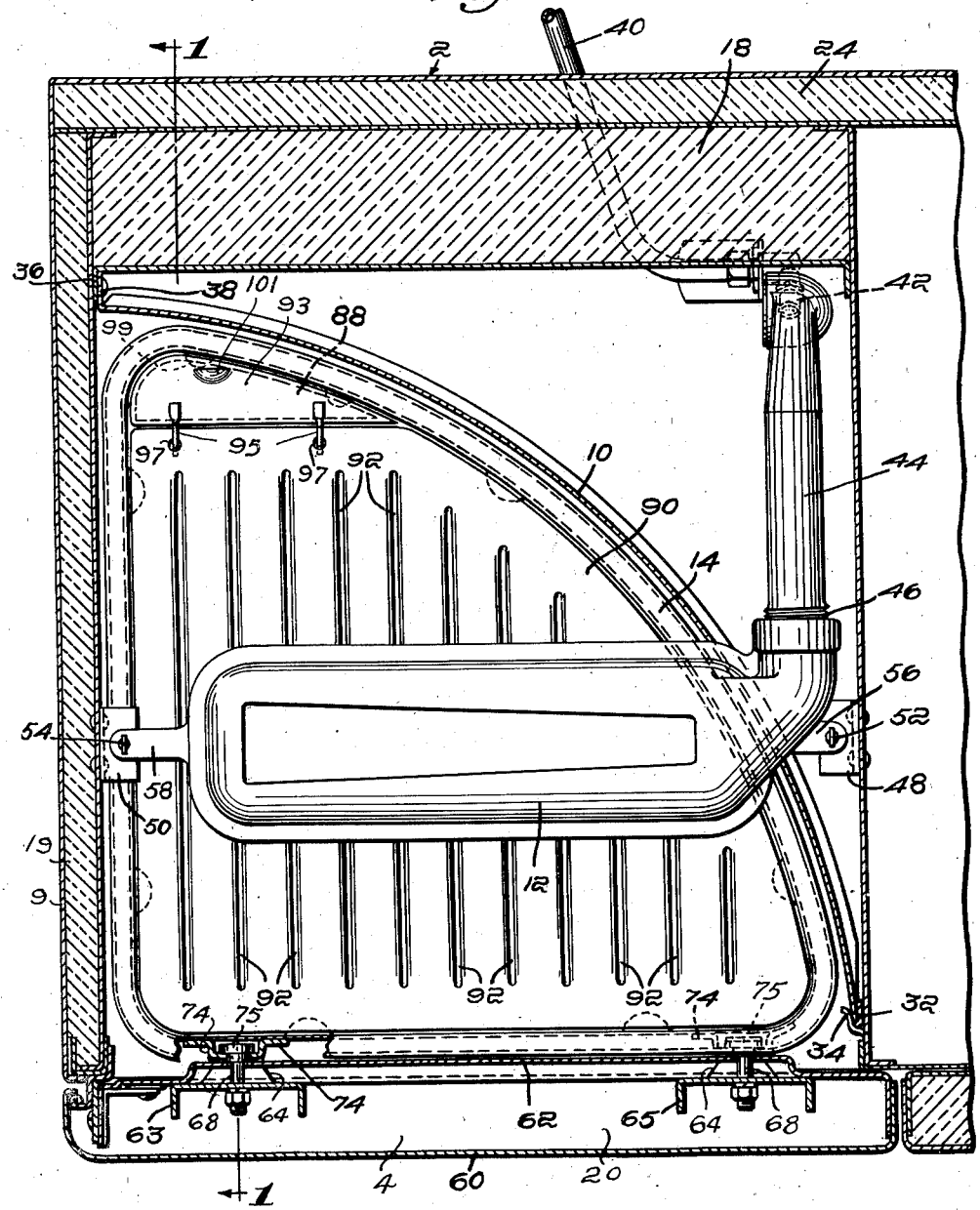

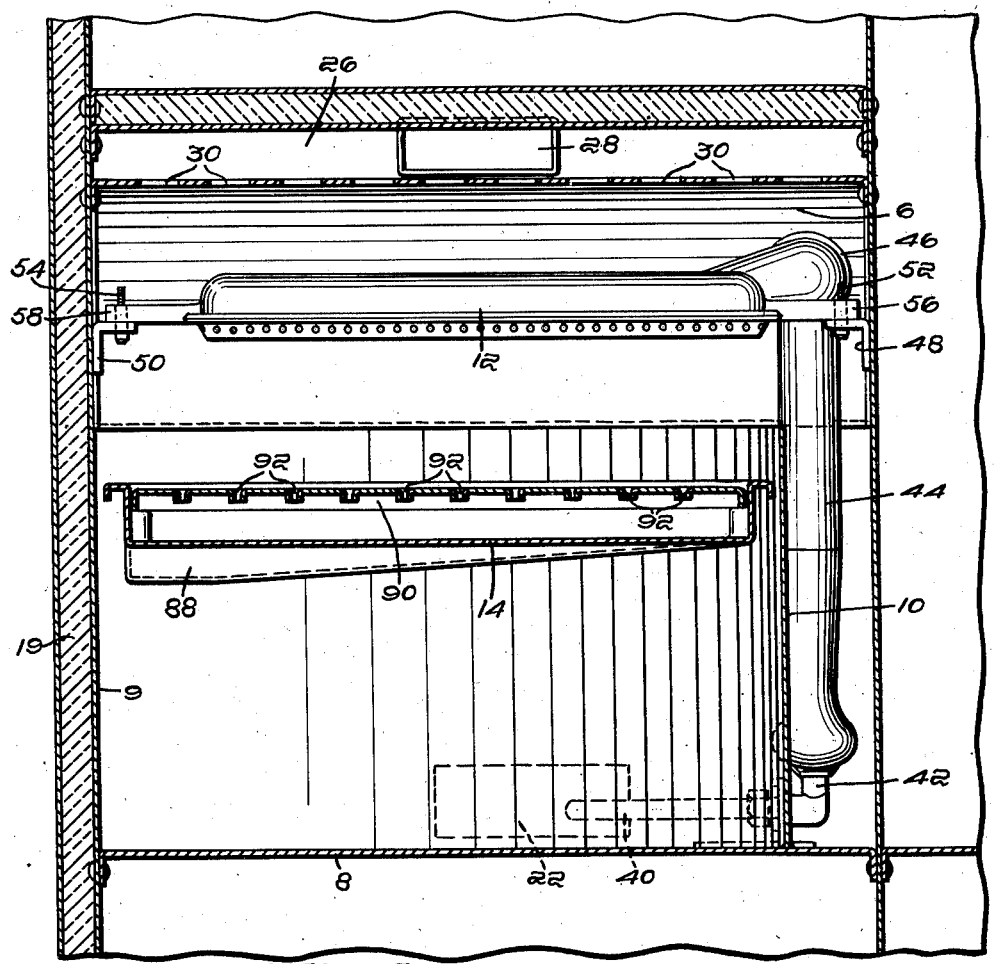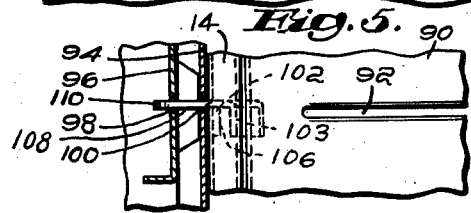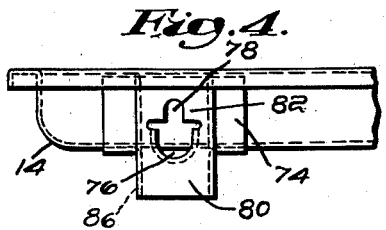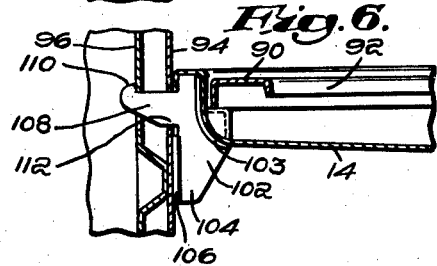

Patented Nov. 11, 1947

2,430,848

UNITED STATES PATENT OFFICE 2,430,848

BROILER

Frank H. Schneider, Gardner, Mass., assignor to Florence Stove Company, Gardner, Mass., a corporation of Massachusetts Application October 27, 1944, Serial No. 560,678

4 Claims. (Cl. 126—41)

This invention relates to broilers, and is particularly concerned with a broiler in which provision has been made for the development of a broiling temperature higher than that which can ordinarily be obtained in a broiler of corresponding size and gas capacity.

In the typical broiler in which the burner is located at the top and the food to be cooked is positioned therebelow, the roof has customarily been flat, and the general shape of the broiler interior has been rectangular at the top, sides, and bottom. When a burner is positioned at the roof of such a broiler, the temperatures are not uniform throughout, and as a result the cooking progresses somewhat irregularly. Furthermore, there will be gradual accumulations of grease from the smoke in those portions of the broiler in which the temperature is not high enough to insure complete combustion.

In the present invention it is contemplated that the roof of the broiler be so shaped that it will produce not only substantially the same temperature over all portions of the broiling area, but also will result in creating a higher temperature than could otherwise be obtained from a burner of the same capacity.

This increase in temperature is basically obtained by an arched roof formation combined with a burner suitably located with respect to the arched roof, and by the proper positioning of the broiling pan on which the food is placed.

A further feature of the invention is the provision of a broiling pan which is attached to or hung from the oven door, so that upon opening the door the pan and food will be swung outwardly for inspection or removal.

A still further object of the invention is the provision of means for adjustably locating the pan at varying distances from the burner, so that the broiling temperatures may be controlled to provide for different types of cooking.

Another feature of the invention includes the provision of a removable wall in the broiler which follows generally the contour of the hanging pan. In addition to the foregoing, another feature of the invention is a burner removable for easy cleaning. Thus, the user may keep the entire apparatus in a satisfactorily clean and sanitary condition without undue effort.

It is also contemplated that there may be provided means for holding the door in open position, so that the food may conveniently be placed on or removed from the pan, and so that the vertical position of the pan may be shifted without the user being troubled by any tendency of the door to swing shut.

These and other features of the invention will become more apparent as the description proceeds with the aid of the accompanying drawings, in which Fig. 1 is a vertical section of the broiler on the line 1—1 of Fig. 2 and including the burner in full side elevation.

Fig. 2 is a horizontal section on the line 2—2 of Fig. 1.

Fig. 3 is a vertical section on the line 3—3 of Fig. 1.

Fig. 4 is a fragmentary side elevation of one corner of the pan, showing the pan connecting means which is utilized in Figs. 1 and 2.

Fig. 5 is a horizontal fragmentary section showing an alternative pan connecting means.

Fig. 6 is a vertical section of the connecting means shown in Fig. 5.

Figure 1:
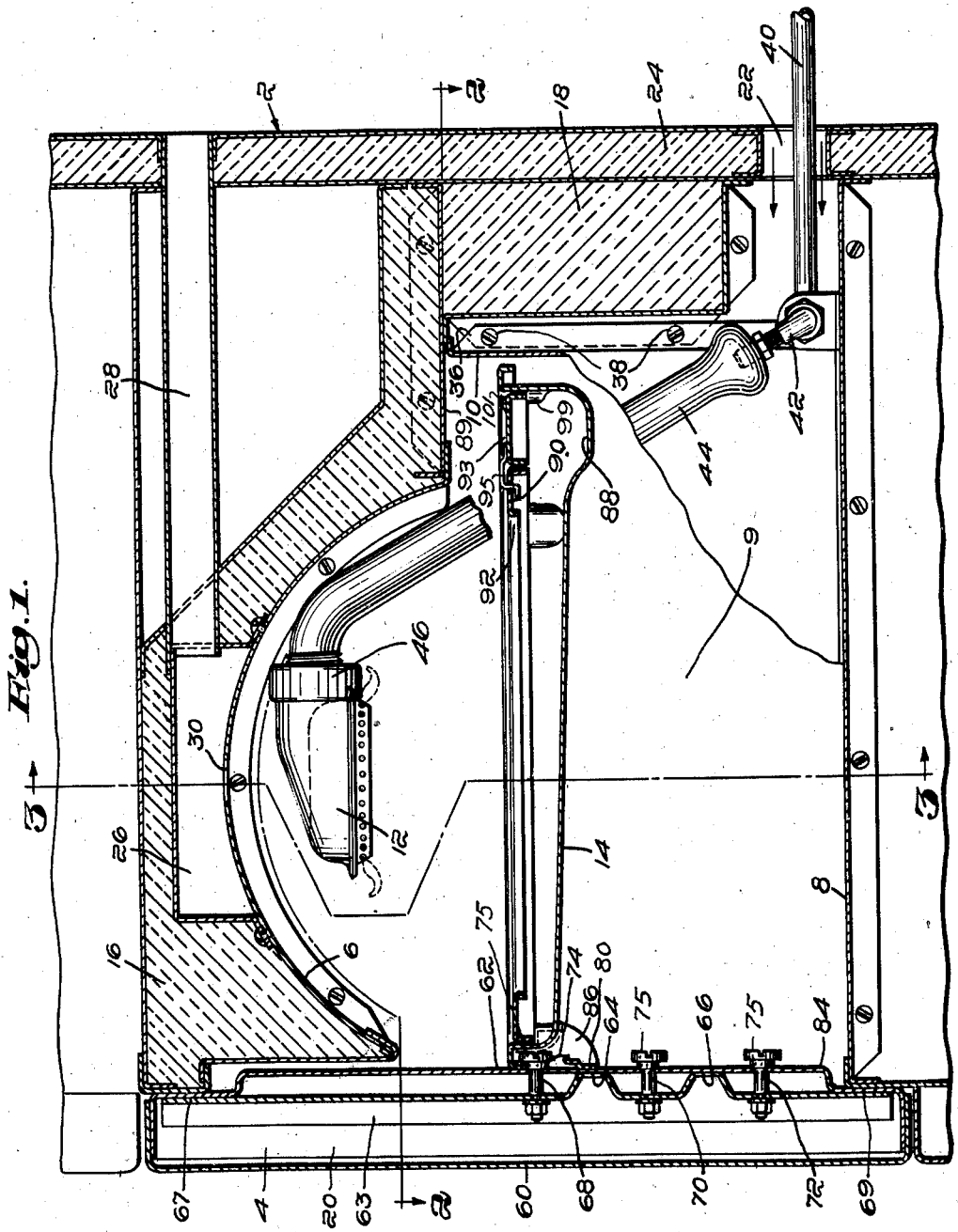

Referring to Fig. 1, the invention comprises a broiler, generally referred to by the numeral 2, having a door 4. The broiler structure proper consists of an arched roof 6, a bottom or floor 8, a side wall 9, and a rear curved vertical wall 10. A burner 12 is located in the arched area and extends across a major portion of the width of the oven.

Hung from the door is a broiler pan 14, which may be located at any of the several positions provided on the interior wall of the door, or if desired it may be placed directly on the floor of the broiler.

The broiler is preferably surrounded by insulating material, the roof being covered by the material 16, the rear wall surrounded by the material 18, the side wall 9 covered by material 19, and the door may be filled with material at 20. It is not customary to insulate the area under the floor, but this may be done if desired.

The air that provides oxygen for combustion enters the broiler through a port 22 at the lower part of the outer rear wall 24 of the broiler housing. The products of combustion are permitted to escape through the transversely extending vent 26, which is connected to the chimney by the exhaust port 28. The arched portion of the roof 6 immediately below vent 26 has a plurality of apertures 30 through which the exhaust gases may pass on their way to exhaust port 28.

Referring more particularly to the details of the broiler construction, it will be seen that the arched roof 6, preferably formed of sheet metal, extends the entire width of the oven and the curvature is sufficient to substantially surround the burner 12. The arched formation results in causing more heat to be directed against pan 14, as not only does the heat from burner 12 pass directly to the pan 14, but a very substantial additional amount is reflected downwardly from the arched roof to the pan surface.

The arrangement of the parts is such that the heat transmitted to the pan regardless of the pan's location is far greater and more uniform than would be the case were the broiler roof of conventional construction.

In Fig. 2 the curved vertical back wall 10 is plainly shown. This wall has been made removable, so that it may be easily cleaned. Removal is accomplished by pressing backwardly against the middle of wall 10, so that the front edge 32 of the wall is moved a sufficient distance to the rear to clear the retaining lip 34. The edge 32 can then be sprung past lip 34 to be drawn forwardly out of the oven. In so doing, the rear flange 36 of wall 10 will be drawn free of the studs 38 which normally hold the rear wall 10 in position.

While wall 10 provides means for blocking off the rear corner of the oven which is not occupied by the broiler pan, still it is not essential as far as the cooking characteristics of the broiler are concerned. If desired, the wall 10 may be omitted without changing the efficiency of the broiler.

The burner 12 is of conventional construction, as far as the burner itself is concerned, but the entire burner unit is formed in such a way that it may be easily withdrawn from the oven. The gas is supplied through pipe 40 and nipple 42, whence it passes into the neck 44 which extends upwardly and forwardly along the right side of the oven, passing over wall 10 to a position just under the arched roof to connect with the right hand end of the burner at 46.

The burner may be supported in the broiler in any convenient manner. One such means is shown in Figs. 2 and 3 and consists of angle brackets 48 and 50, which carry vertical studs 52 and 54. The burner is suspended from lugs 56 and 58, both of which contain suitably located holes to receive studs 52 and 54. Thus the burner when supported by brackets 48 and 50 is adequately maintained against accidental dislodgement. When it is desired to remove the burner from the broiler, it is merely raised enough to clear studs 52 and 54 and then drawn forwardly and downwardly, at which time neck 44 slides off nipple 42 and over wall 10. In this way the burner may be easily removed for cleaning.

It will be noticed that the burner 12 runs lengthwise, so that heat is projected downwardly both directly and indirectly over all portions of the pan. The burner is located within the confines of the arch itself, and is so close to the arched roof that the temperature is much higher than usual in this area.

The heat that is applied to the broiling surface is the aggregate of that which goes directly downward from the burner itself and that which goes indirectly by reflection from the arched roof. The arrangement is such that substantially uniform distribution of heat over the broiler pan surface results.

It will be understood, however, that while reference has been made to a gas burner as the source of heat, the invention contemplates a heat source of any suitable type, as for example, an electric resistance element.

The adjustable pan construction is so arranged that the pan is wholly supported by the door alone. The door is sufficiently rigid and the pan likewise is strong enough to act as a cantilever capable of supporting such weight as would normally be placed thereon.

The pan supporting structure is shown in Figs. 1, 2, and 4. The door structure which carries the pan 14 is shown in Figs. 1 and 2. The door has an outer surface 60 and an inner surface 62. Intermediate of these two surfaces and extending vertically at either side, are two shallow channel irons 63 and 65, as in Fig. 2, which are secured against the inner surface 62 at the top and bottom as at 67 and 69 in Fig. 1. At certain places throughout their lengths, as at 64 and 66 in Fig. 1, the channels have raised areas which engage the inside surface 62. These points of engagement are positioned where pressure from the pan is exerted, so as to give the necessary support. Two vertically aligned series of bolts 68, 70, and 72, pass through channels 63 and 65 and the inner surface 62. These two vertical rows of bolts are seen in Fig. 2, one to the right and one to the left. Suitable shoulders on the shanks of the bolts maintain the heads of the bolts a short distance inwardly of the surface 62, so that the pan may be locked on the bolts with the pan engaging portion behind the heads.

The particular pan connecting means is shown in detail in Fig. 4. The pan 14 has spot-welded or otherwise fixed thereto two connectors 74 of heavy sheet metal or other suitable material. The connectors 74 are in the form of shallow channels with lateral flanges, as seen in Fig. 2. The central portions are cut away at 76, forming holes of sufficient area to receive the heads of bolts 68, 70, and 72. The upper portion of the cut-away area 76 terminates in a more restricted zone 78, which is large enough to pass over the bolt shoulders but small enough to trap the bolt heads behind the side portions 82.

The two connectors 74, one at each side of the pan, are accurately spaced so that when the pan is placed against the door, the bolt heads will pass through the holes 76, permitting the back surface 80 of the connector to rest against surface 62. The pan can then be lowered horizontally so that the back surface 80 slides downwardly along the surface 62 until the bolt heads are locked behind the side portions 82 of the restricted areas 78.

The lower part of back surface 80 rests against the surface 62 at the supported position 64 when the pan is at its highest location or against supported position 66 at the intermediate location, or against the supported area 84 at the lowermost position. The web 86, see Fig. 1, of connector 74 provides sufficient strength to prevent any appreciable downward bending of the pan when locked to the door. Thus it will be seen that the pan may readily be located on the door at a position to provide desired cooking conditions.

The pan itself is shaped as shown in the pan view in Fig. 2, having the left edge close to the left wall 9, while the front edge is against the back of the door and the curved edge is close to wall 10. The bottom of the pan is shallow at the front and slopes to the rear, terminating in a depressed area, or well, at 88, into which fats or gravy may drain. The well 88 is located at the rearmost portion of the broiler pan where it is most remote from the burner.

It will also be observed in Fig. 1 that well 88 is located below the horizontal portion 89 of the top of the oven that extends rearwardly from the bottom of the arch to form a secondary roof at a level below the burner. Thus the well is substantially out of the line of both the direct and reflected heat, and therefore is very much cooler than any other place in the broiling pan. The fats that collect in well 88 are relatively cool and smoking is thereby minimized. Those carbohydrates that are generated and rise upwardly toward the exhaust in the form of smoke pass through an area of such intense heat that the combustion point is reached, so that all of the unconsumed carbon that constitutes the smoke is completely burned. Sufficient oxygen to support this combustion enters through port 22. This results in a non-smoking broiler which permits its use without any chimney connection.

Supported by indented portions of the pan wall is a food supporting rack 90, which may be formed of pressed sheet metal having a series of longitudinal slots 92 through which the fats from the food may drain. This rack is removable from the pan for easy cleaning.

The well 88 is covered by a small hinged cover 93. The hinged connection between this cover and the rack 90 may be in any convenient form and as shown consists of a pair of wire members 95 secured to the top of cover 93 which pass over the edge of rack 90 and downwardly through holes 97. The upper edge of cover 93 is supported by the indented portion 99 of the rack 90. To facilitate lifting the cover a small section of the cover has been bent upwardly as at 101 to provide a member which may be gripped by the finger or a fork or spoon. Cover 93 further assists in maintaining the fats in well 88 at a lower temperature.

It will be noted that the bottom of the connector 74 terminates at a point which is on the same level with the bottom of the fat collecting well 88. Thus, when the pan is removed from the door and is placed on the stove bottom or on a table, it will be maintained level because of the equal length of the three supporting legs.

A modified form of construction of means for connecting the pan to the door is shown in Figs. 5 and 6. Here the inner surface of the door is numbered 94 and the vertical channel 96. Vertically aligned slots 98 and 100 extend through the surface 94 and channel 96, and through these the connectors may be passed. This connector consists of a unit 102 which may be welded or bolted to the edge of the pin 14 by the flange 103. The downwardly extending web portion 104 has a flange 106 adapted to press against surface 94 at the area supported by the raised portions of channel 96. Lug 108, with an upwardly turned hook 110, extends away from pan 14. The lug 108 may be passed through the slots 98 and 100 in a downwardly direction in order to enable hook 110 to engage behind the upper end of slot 98. When the hook 110 has passed beyond the inside of channel 96, the pan may then be lowered to horizontal position, and the hook 110 will swing upwardly to engage behind channel 96, thus locking the pan in position. Downward movement of the pan is prevented by the engagement of bottom of slot 100 with lug 108 at the point 112. Thus hook 110 cannot become disconnected without lifting the near end of the pan above the horizontal.

While a preferred form of the invention has been shown and described, it will be understood that the invention is not to be limited thereby, but only by the appended claims.

I claim:

1. In a broiler, means providing an enclosed space including an arched roof, a source of heat mounted within said enclosed space and within the arch of said roof so as to direct heat downwardly and whereby additional heat from said source is reflected downwardly over a limited area by the arched roof, means for supporting food to be heated below said arched roof so as to be heated by heat directly from said source and by the reflected heat, fat-collecting means carried by said supporting means and said fat-collecting means being positioned outside the area heated by reflection from said arched roof.

2. In a broiler, means providing an enclosed space including an arched roof, a source of heat mounted within said enclosed space and within the arch of said roof so as to direct heat downwardly and whereby additional heat from said source is reflected downwardly by the arched roof in a confined area, a secondary roof extending laterally from the arched roof at an abrupt angle thereto so as to be shielded from the heat reflected by the arched roof, means for supporting food to be heated below said source of heat and said arched roof, fat-collecting means carried by said supporting means and said fat-collecting means positioned under the secondary roof and outside the area of reflected heat.

3. In a broiler, means providing an enclosed space including an arched roof, a source of heat mounted within said enclosed space and within the arch of said roof so as to direct heat downwardly and whereby additional heat from said source is reflected downwardly in a limited area by the arched roof, a pan within the enclosed space below said source of heat and said arched roof, and a well in said pan positioned outside the area heated by reflection from said arched roof.

4. In a broiler, means providing an enclosed space including an arched roof, a source of heat mounted within said enclosed space under said arched roof so as to direct heat downwardly and whereby additional heat from said source is reflected downwardly in a limited area by said arched roof, a pan within said enclosed space below the source of heat, a well carried by said pan being located entirely outside the heat reflected downwardly by said roof, said means having an air inlet port below said well, and said means having an outlet aperture in said arched roof to permit the escape of the products of combustion.

FRANK H. SCHNEIDER.

REFERENCES CITED

The following references are of record in the file of this patent:

UNITED STATES PATENTS

| Number | Name | Date |
|---|---|---|
| 461,953 | Edmonds | Oct. 27, 1891 |
| 1,257,234 | Hollands | Feb. 19, 1918 |
| 1,632,719 | White | June 14, 1927 |
| 1,954,080 | Kahn | Apr. 10, 1934 |
| 1,963,817 | Wiederhold | June 19, 1934 |
| 2,102,482 | Parker | Dec. 14, 1937 |
| 2,125,989 | Burch | Aug. 9, 1938 |
| 2,219,787 | Parker | Oct. 29, 1940 |
| 2,296,140 | Brodbeck | Sept. 15, 1942 |
| 2,323,821 | Lindemann et al. | July 6, 1943 |
| 2,350,293 | Stanchfield | May 30, 1944 |

FOREIGN PATENTS

| Number | Country | Date |
|---|---|---|
| 8,585 | Great Britain | 1893 |
| 100,438 | Switzerland | Aug. 1, 1923 |
| 547,015 | France | Sept. 9, 1922 |